July 21, 1942.  R. H. RAY  2,290,354
GEOPHYSICAL INSTRUMENT MOUNTING
Filed Feb. 3, 1939  4 Sheets-Sheet 2

INVENTOR
Robert H. Ray
BY Geo. L. Parkhurst
ATTORNEY

July 21, 1942.     R. H. RAY     2,290,354
GEOPHYSICAL INSTRUMENT MOUNTING
Filed Feb. 3, 1939     4 Sheets-Sheet 3
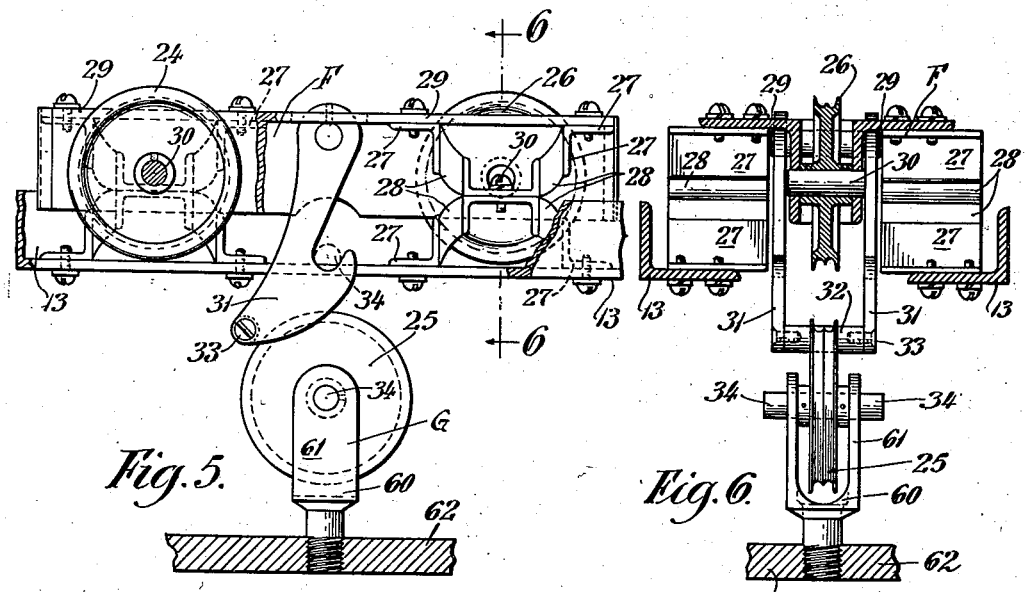
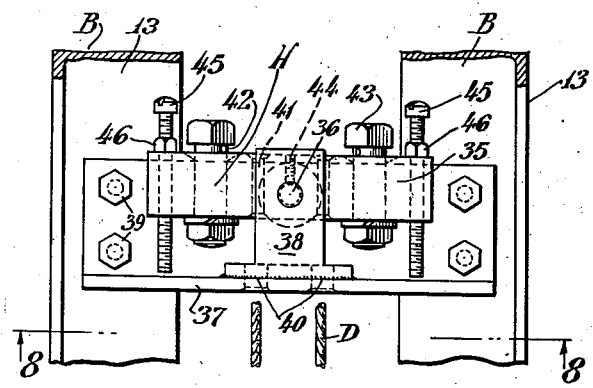
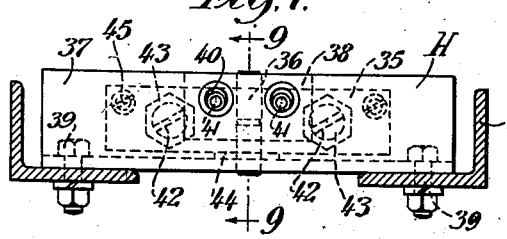
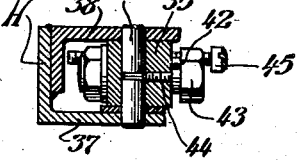
INVENTOR
Robert H. Ray
BY Geo. L. Parkhurst
ATTORNEY July 21, 1942.    R. H. RAY    2,290,354
GEOPHYSICAL INSTRUMENT MOUNTING
Filed Feb. 3, 1939    4 Sheets-Sheet 4
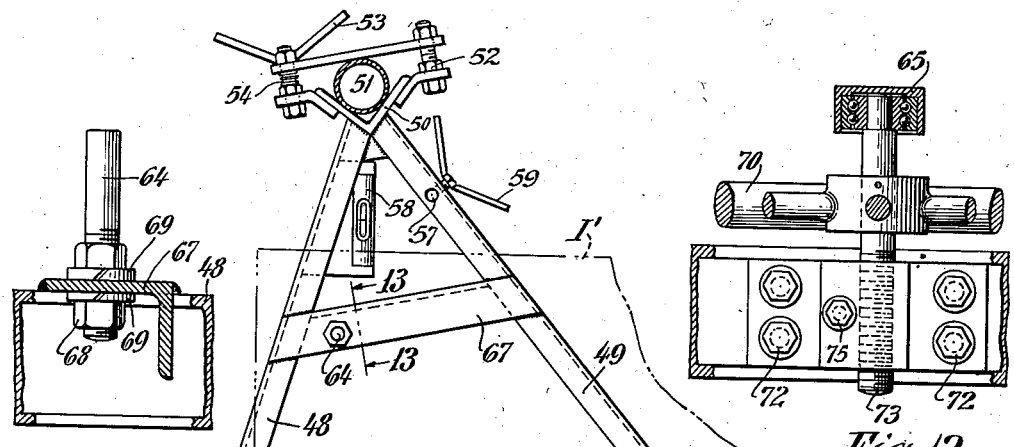
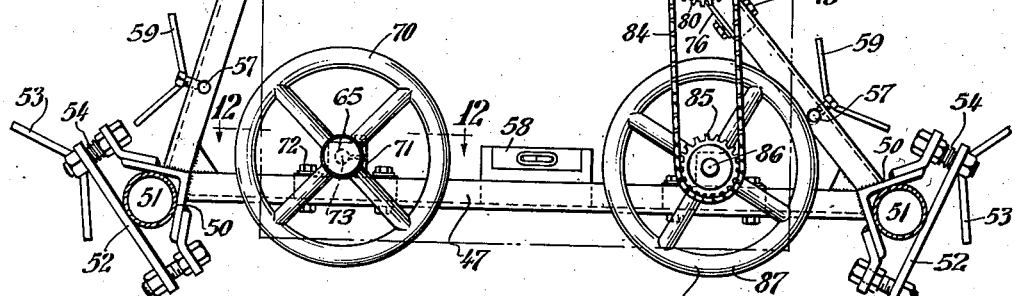
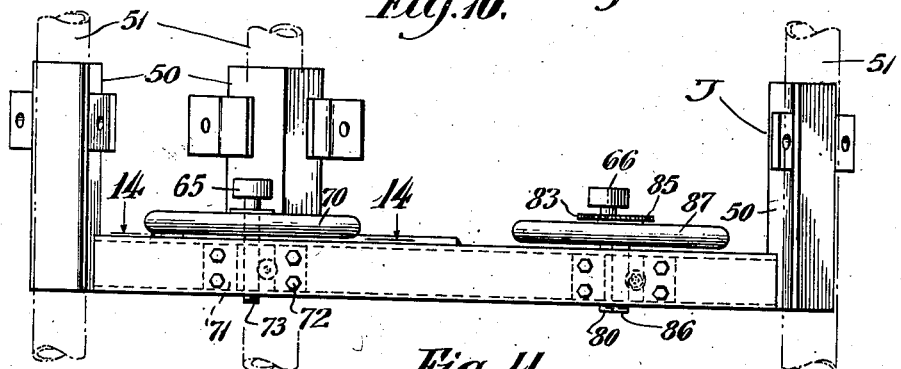
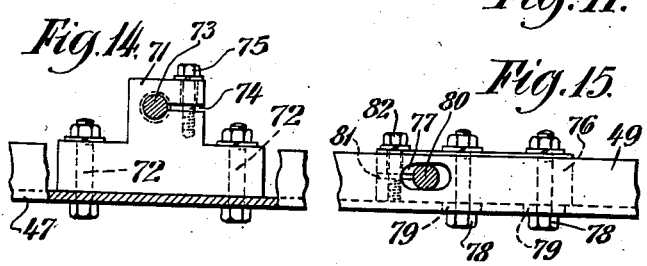
INVENTOR
Robert H. Ray,
BY Geo. L. Parkhurst
ATTORNEY Patented July 21, 1942

2,290,354

UNITED STATES PATENT OFFICE 2,290,354

GEOPHYSICAL INSTRUMENT MOUNTING

Robert H. Ray, Houston, Tex., assignor to Stanolind Oil and Gas Company, Tulsa, Okla., a corporation of Delaware Application February 3, 1939, Serial No. 254,354

2 Claims. (Cl. 265—1.4)

This invention relates to a geophysical instrument mounting and more particularly to a mounting which makes it possible to transport a geophysical instrument in a truck, boat or other vehicle and to use the instrument without removal from the vehicle and without manual lifting. While the invention is applicable to a wide variety of geophysical instruments, it has been designed particularly in connection with a gravity meter mounting.

Geophysical instruments in general and gravity meters in particular are usually very bulky and heavy due to auxiliary equipment and also very delicate insofar as the sensitive force-responsive members and their suspensions are concerned so that handling involves at one and the same time a large amount of physical labor and considerable danger of injury to the instrument. These instruments are customarily transported from place to place in trucks or similar vehicles. These vehicles are commonly equipped with tripods which can be projected through the floor of the vehicle and after the tripod is in place with its feet on the ground, the instrument has customarily been lifted by sheer manual labor and placed on the head of the tripod.

It is an object of my invention to avoid the necessity of manual handling of geophysical instruments and to provide a geophysical instrument mounting by means of which the instrument can be transported safely and without jar together with provision for lowering the instrument into contact with a tripod or other supporting member which is in turn in contact with the ground. Another object of my invention is to provide a mounting of the type described which will permit ready orientation of the geophysical instrument. Another object of my invention is to provide a geophysical instrument mounting which will minimize the mechanical labor necessary in the use of such an instrument. Other and more detailed objects, advantages and uses of my invention will become apparent as the description thereof proceeds.

The invention will now be described in detail in connection with the accompanying drawings which illustrate one specific embodiment thereof. In the drawings:

Figure 5 is a detailed elevation, partly in section and partly broken away, showing the shock-mounted table and instrument carrier;

Figure 6 is a sectional elevation of the shock-mounted table taken in general along the line 6—6 of Figure 5;

Figure 7 is a detailed plan view of the cable anchor;

Figure 8 is a sectional elevation of this same cable anchor taken along the line 8—8 of Figure 7;

Figure 9 is a sectional elevation of this cable anchor taken along the line 9—9 of Figure 8;

Figure 10 is a top plan view of the tripod assembly;

Figure 11 is a front elevation corresponding to Figure 10;

Figure 12 is a rear elevation detail, partly broken away, taken in general along the line 12—12 of Figure 10;

Figure 13 is a detailed elevation taken along the line 13—13 of Figure 10;

Figure 14 is a detailed sectional plan view taken along the line 14—14 of Figure 11; and Figure 15 is a similar detailed sectional plan view of the mounting of the rear sprocket wheel shown in Figure 10.

Figure 1:
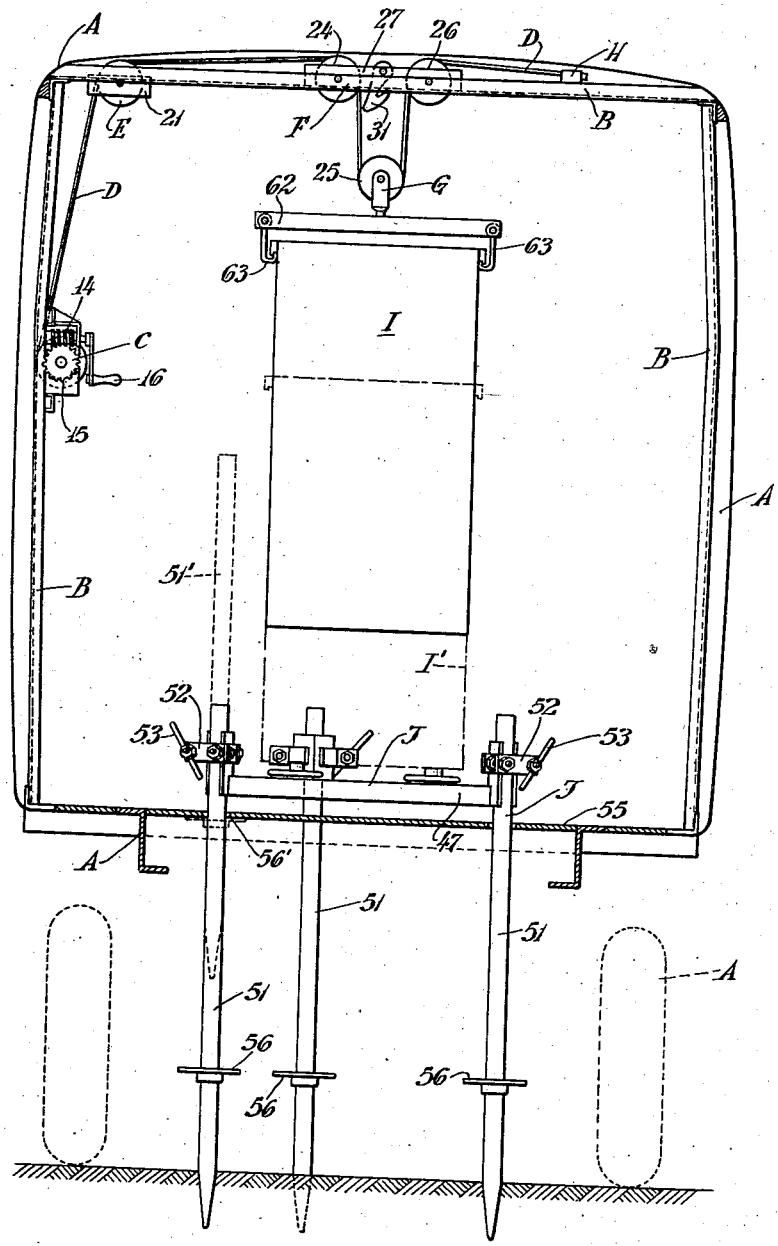
Figure 1 is a rear elevation of a truck with the back open showing the general features of my geophysical instrument mounting.

Turning now to Figure 1, it will be seen that a truck A, shown only in general outline, carries a frame B supported from the floor of the truck. On one side of this frame B is a winch and drum mechanism C which controls double cable D passing over idler pulley E to shock-mounted table F, from it to instrument carrier G, thence back to shock-mounted table F and to cable anchor H. Instrument carrier G is attached to geophysical instrument I. Beneath the geophysical instrument is mounted a tripod assembly J.

In briefest terms the operation of the mounting comprises lowering the legs of the tripod into contact with the ground and lowering the geophysical instrument onto the tripod by means of winch and drum mechanism C. The operation is in fact considerably more complicated than this and will be described in detail later.

Figures 2, 3, 4:
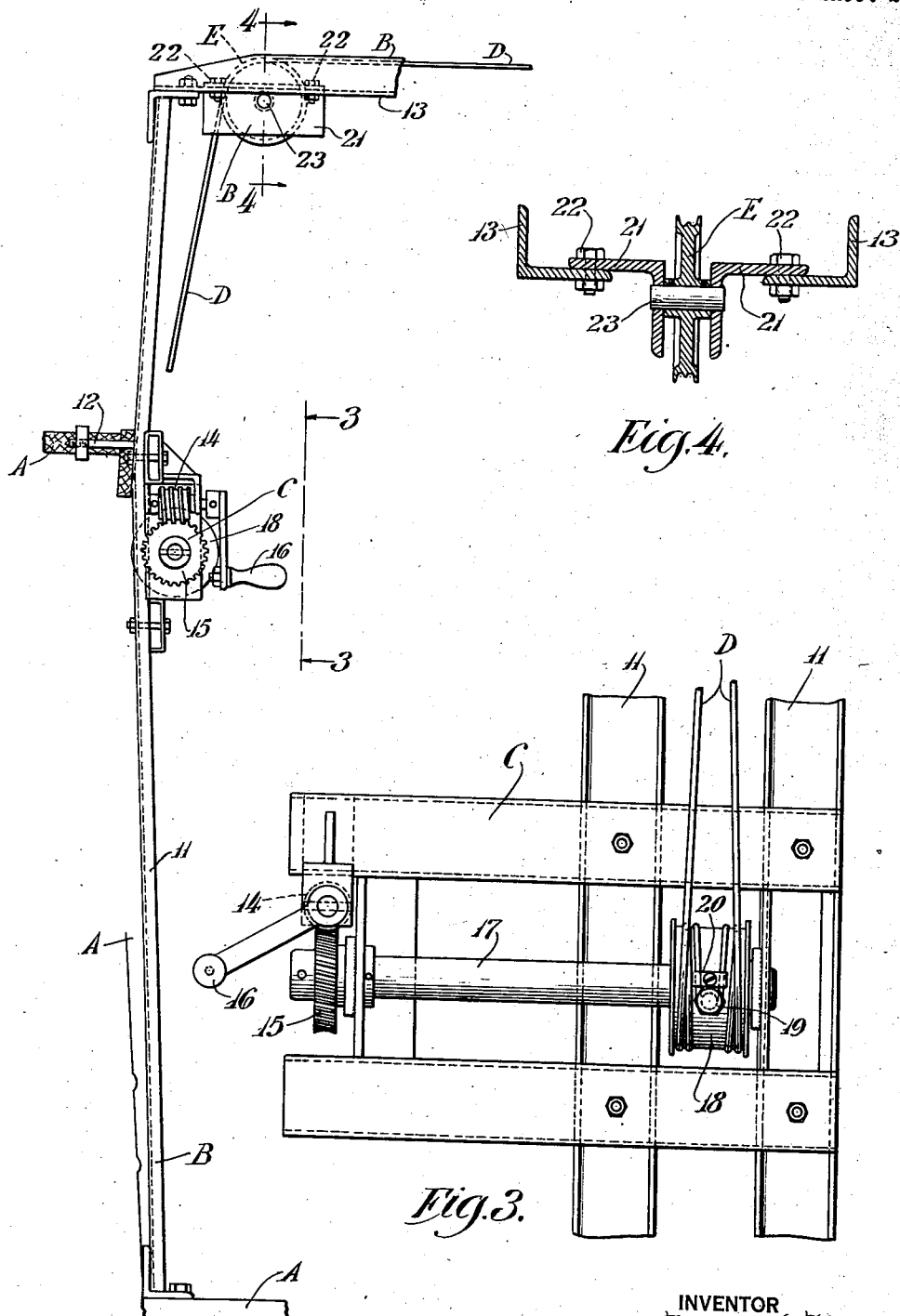
Figure 2 is a detailed elevation showing part of the frame of my geophysical instrument mounting and also showing the winch mechanism and the idler pulley.
Figure 3 is a detailed elevation of the winch and drum mechanism taken along the line 3—3 of Figure 2.
Figure 4 is a detailed sectional elevation of the idler pulley and its mounting taken along the line 4—4 of Figure 2.

Turning to Figures 2 and 3, it will be seen that the sides of the frame B each include twin channels 11 attached to the floor of the truck and also attached to the side of the truck as illustrated by bolt 12. These side channels carry angles 13 which form the top of the frame B. The weight of the frame and of the parts carried by it rests on the floor of the truck.

The winch and drum mechanism C is best seen in Figure 3. It includes a self-locking worm 14 and worm wheel 15. The former carries handle 16 and the latter is mounted on shaft 17 which also carries drum 18 mounted between the two channels 11. Double cable D, the ultimate purpose of which is to support the geophysical instrument, passes around screw 19, is anchored by anchor bar 20 and then passes around drum 18.

From drum 18 the two cables, or the two ends of a one-piece cable, pass to idler pulley E which is mounted on brackets 21 which are in turn affixed by bolts 22 to angles 13 which form the top of frame B. The pulley is journaled on shaft 23 which is carried by brackets 21. From this idler pulley E the twin cables pass to the left-hand pulley 24 which forms a part of the shock-mounted table assembly F as best seen in Figures 5 and 6. From this pulley they pass down to idler pulley 25 which forms part of the geophysical instrument carrier G and thence they pass up to and over the right-hand pulley 26. The two pulleys of the shock-mounted table assembly are sufficiently far apart so that the idler pulley 25 can enter between them.

As best seen in Figure 6, the shock-mounted table assembly F is supported on angles 13 which form the top of frame B. To these angles 13 are attached the lower angles 27 of four sets of double shock mounts 28, the structure of which is apparent from Figure 5. The upper angles 27, which with the lower angles 27 make up the frames of the shock mounts, carry bracket 29 in which are shafts 30 on which pulleys 24 and 26 are journaled. This bracket 29 carries two swinging hooks 31, the lower ends of which are connected by bar 32 and machine screws 33. Thus when idler pulley 25 is raised by operation of the winch C the hooks 31 are deflected to the left as seen in Figures 1 and 5 and the hook ultimately slips under shaft 34 of the geophysical instrument mounting head assembly so that while the instrument is being transported, it is held securely by means of the two hooks 31.

From the right-hand pulley 26 of the shock-mounted table assembly F, the twin cables D pass to a cable anchor H which is best seen in Figures 7, 8 and 9. The purpose of this cable anchor is not only to provide a support for the ends of the two parallel supporting cables D but also to provide a means of obtaining equal stress in these two cables without permitting too great a motion of the instrument I in case of the failure of one of the cables. This anchor includes a bar 35 which is pivoted on a shaft 36 held in a frame formed of angles 37 and 38. This frame is in turn mounted on angles 13 by means of bolts 39. The cables pass through holes 40 in angle 37 and holes 41 in bar 35. They are then bent and passed through holes 42 in bolts 43 which are tightened to hold the cables securely in place. Allen set screw 44 holds shaft 36 in place. Cap screws 45 which are held in adjusted position by means of lock nuts 46 limit the rotation of bar 35 on failure of one of the cables and thus limit any sudden motion of the instrument I by virtue of the failure of one of these cables. At the same time the anchor being pivoted insures equal stress in the two cables.

Turning now to the fourth sheet of drawings which illustrates the tripod assembly, it will be seen that a tripod head is formed from three channels 47, 48 and 49 and that these channels carry vertical angles 50 at the three corners of the tripod head. These angles, which are welded in place, serve as guides for the three legs 51 and these legs may be clamped in place by means of clamps 52. The structure of these clamps will be self apparent from Figure 10 of the drawings. The clamps are operated by means of wing bolts 53, being normally urged to unclamped positions by springs 54. When the truck or other vehicle is in motion the tripod head (angles 47, 48 and 49) rests on the floor 55 of the vehicle A and the tripod legs 51 are clamped in raised position 51' (Figure 1) with flanges 56 in contact with the lower surface of the floor of the truck as shown by dotted lines 56' in Figure 1.

When it is desired to use the geophysical instrument I, the first step is to insert pins (not shown) in holes 57 (Figure 10). Wing nuts 53 are loosened sufficiently to permit the tripod head to be raised by hand until a rough level is obtained as indicated by levels 58. Wing set screws 59 are then tightened to hold the pins in place and the tripod head is thus supported above the floor of the cab on the pins in roughly horizontal position. Wing nuts 53 are then further loosened and the tripod legs 51 are lowered and pounded into firm contact with the ground. Wing nuts 53 are then tightened, wing set screws 59 are loosened and the pins are removed if so desired. The tripod assembly is now in condition to receive the geophysical instrument and it is lowered into place in position I' (Figures 1 and 10) by first raising it slightly by means of winch C to disengage hooks 31 and then lowering it onto the tripod head.

In the course of the lowering operation the instrument I can be oriented readily by means of a swivel mounting 60 in yoke 61 of the instrument carrier (Figures 6 and 7), and this orientation is very important in the case of many geophysical instruments, notably gravity meters and torsion balances. Below the swivel mounting, yoke 61 is threaded to bar 62 carrying latches 63 which support instrument I when the latter is in elevated position. After the instrument has been lowered onto the tripod it can be unlatched from the instrument carrier G and the latter can be raised out of the way.

The instrument when lowered is supported on three contact points 64, 65 and 66. Of these, contact point 64 is shown in detail in Figure 13 and is a fixed contact point mounted on cross member 67 which is in turn mounted on channels 48 and 49 which form part of the tripod head as seen in Figure 10. This fixed contact point 64 is threaded at its lower end and held in place by means of nuts 68 and lock washers 69. The other two contact points 65 and 66 are thrust bearings as seen in Figures 10, 11 and 12. The use of these bearings avoids moving the instrument horizontally when the final adjustment is made. These thrust bearings are adjustable in vertical position and a final highly accurate leveling can thus be accomplished. This final leveling utilizes levels (not shown) which are mounted on the case of the geophysical instrument I. The nature of the adjusting mechanism is shown in Figures 10, 11, 12, 14 and 15. Hand wheel 70 is used to adjust the position of the left-hand thrust bearing as seen in Figure 12. Figure 14 illustrates the bracket 71 on which the adjusting mechanism is mounted. This bracket is mounted on channel 47 by means of bolts 72. Provision is made for adjusting the friction between threaded shaft 73 (Figure 12) and the corresponding threaded opening in the bracket 71. This adjustment is obtained by means of slot 74 and cap screw 75.

Since the observer utilizing the geophysical instrument normally sits in front of the assembly as shown in Figure 10, the right-hand thrust bearing 66 is inaccessible and provision must therefore be made for adjusting its vertical position from the observer's side of the instrument. This is done by mounting the thrust bearing in bracket 76 as shown in Figure 15. The top of channel 49 in which bracket 76 is mounted contains an elongated slot 77 and bolts 78 which mount the bracket also pass through elongated slots 79 in the side of channel 49 so that the position of this bracket on the channel can be adjusted. The bracket is threaded to receive a threaded shaft 80 similar to shaft 73 of Figure 12 and is provided with a slot 81 and cap screw 82 for adjusting the friction. However, instead of a hand wheel, shaft 80 carries a sprocket wheel 83 as shown in Figure 10 and this cooperates with roller chain 84 passing around a second sprocket wheel 85 mounted on shaft 86 which carries hand wheel 87 and which is mounted in turn in a bracket similar to that of Figure 14 carried by channel 47. Thus by operation of the two hand wheels 70 and 87 the vertical positions of the thrust bearings 65 and 66 can be adjusted until the instrument I is accurately leveled. The readings can then be taken and the instrument can then be latched onto the carrier and lifted by means of the winch until the ends of shaft 34 slip into hooks 31. The wing nuts 53 can then be loosened, the tripod legs 51 raised and the wing nuts re-tightened. Since the tripod legs are raised until flanges 56 hit the floor 55 of the truck, the tripod is held rigidly in position and cannot bounce about.

While my invention has been described with particular reference to one specific embodiment thereof, it is to be understood that this is by way of illustration and not by way of limitation and that other modifications comprehended within the scope of the appended claims will occur to those skilled in the art.

I claim:

1. In apparatus for mounting and transporting a geophysical instrument including a vehicle and means for supporting said geophysical instrument when in use in fixed and accurately leveled position within said vehicle, the improved combination which comprises a head assembly on said instrument comprising a pulley member including a pulley, said pulley member being adapted to carry the weight of said instrument, and means projecting perpendicular to the faces of said pulley on each side of said pulley member, means cooperating with said pulley for raising said instrument from said supporting means and lowering it thereon, and a pair of resiliently mounted hooks adapted to cooperate with said projecting means to hold said instrument in raised position independently of said pulley.

2. Apparatus according to claim 1 wherein a horizontal member connects the ends of said hooks so as to come in contact with the periphery of said pulley member and cause said hooks to move to one side and allow said projecting means to reach the operative portions of said hooks.

ROBERT H. RAY.